United States Patent [19]
Baker et al.

[11] 3,757,931
[45] Sept. 11, 1973

[54] AUTOMATIC CONVEYOR SYSTEM FOR BUILDINGS AND THE LIKE

[75] Inventors: Terry M. Baker; Henry W. Huthsing; Robert B. Kieding; Edwin D. Reddan, all of Santa Barbara, Calif.

[73] Assignee: Rolair Systems, Inc., Santa Barbara, Calif.

[22] Filed: June 9, 1971

[21] Appl. No.: 151,318

[52] U.S. Cl. .............................. 198/218, 214/38 C
[51] Int. Cl. .................................... B65g 25/04
[58] Field of Search ................... 198/219, 221, 218; 214/38 C

[56] References Cited
UNITED STATES PATENTS

| | | | |
|---|---|---|---|
| 2,828,027 | 3/1958 | Stevenson | 214/38 C |
| 3,357,582 | 12/1967 | Witter | 214/38 C |
| 3,322,259 | 5/1967 | Milazzo | 198/219 |

Primary Examiner—Richard E. Aegerter
Attorney—Harris, Kiech, Russell & Kern

[57] ABSTRACT

A conveyor system for handling large units such as houses and portions thereof. A plurality of parallel conveyor plates set in the floor of an assembly area, with compliant air bearing or air cushion units for raising the plates to engage and raise the loads from the floor, and drive units for translating the raised plates and loads, after which the air bearing units are deflated to lower the loads to the floor in a new position and the plates are moved in the opposite direction to the initial position. A bed for a plurality of air bearing units with the bearing surfaces between the bed and the plate to support the reciprocating load carrying plate.

9 Claims, 7 Drawing Figures

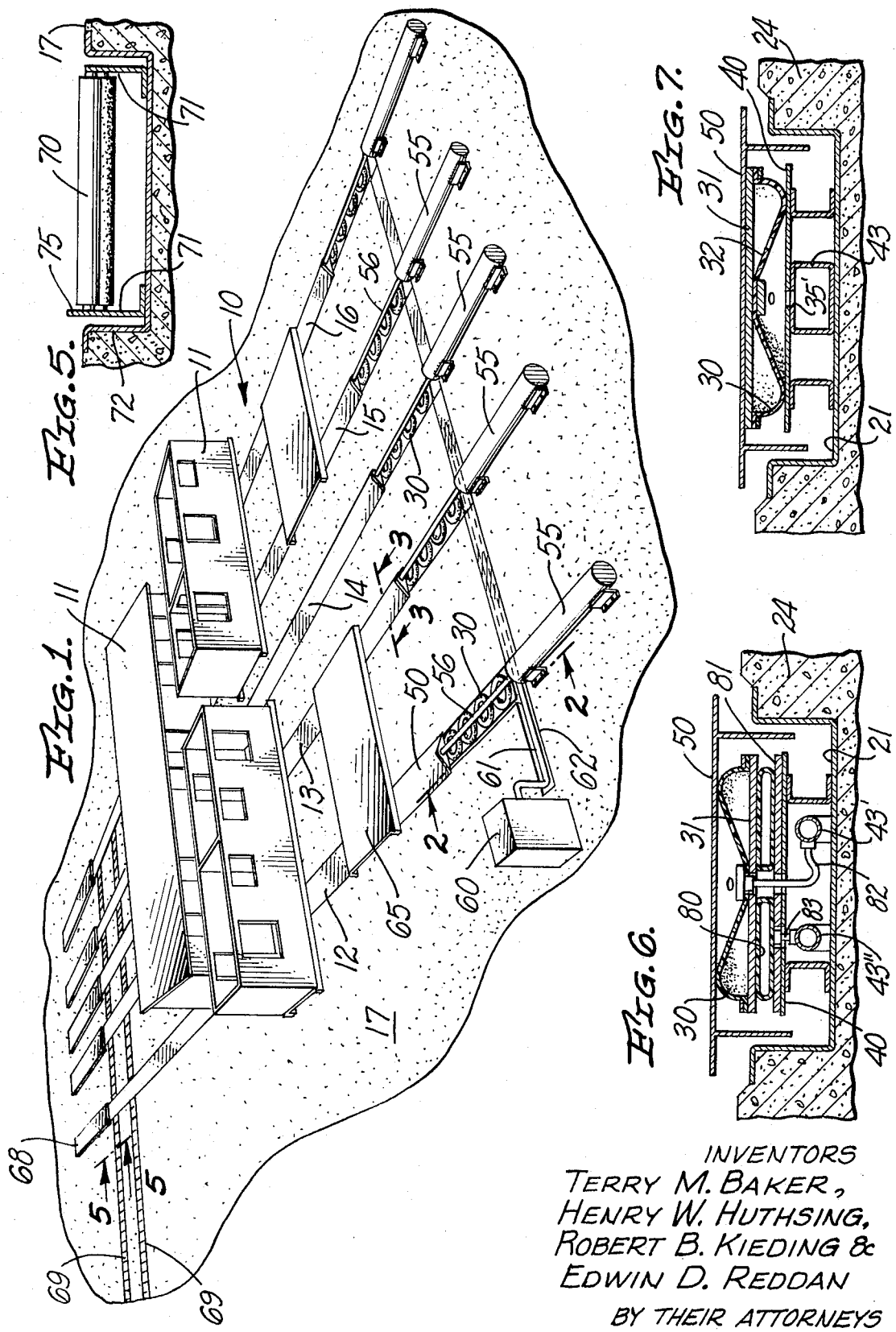

Patented Sept. 11, 1973
3,757,931
2 Sheets-Sheet 2
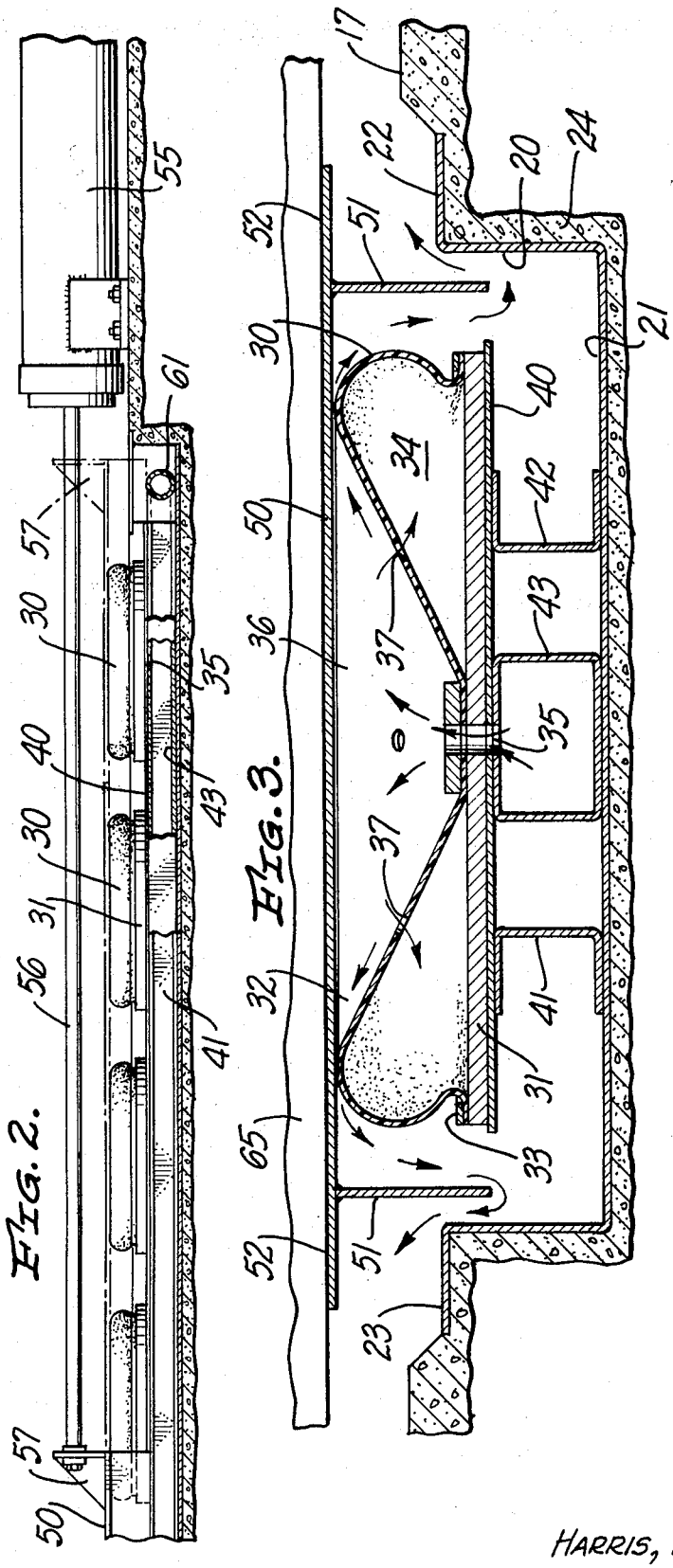
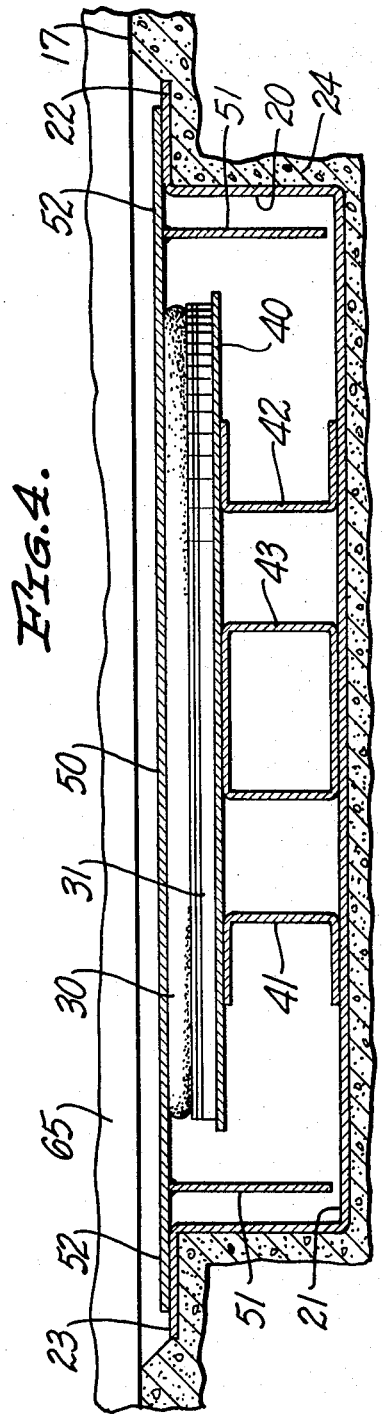
INVENTORS
TERRY M. BAKER,
HENRY W. HUTHSING,
ROBERT B. KIEDING &
EDWIN D. REDDAN
BY THEIR ATTORNEYS
HARRIS, KIECH, RUSSELL & KERN

AUTOMATIC CONVEYOR SYSTEM FOR BUILDINGS AND THE LIKE

This invention relates to conveyor systems and in particular to a new and improved conveyor system suitable for moving large loads, such as houses or portions thereof, along an assembly line. A typical requirement is for moving a house module 60 feet long and weighing 30,000 lbs. stepwise through an assembly area, moving in 12 foot steps every 24 minutes. It is highly desirable that the conveyor system be inexpensive and safe to operate, require little or no maintenance, and utilize little or none of the working area and not obstruct any of the working area.

Conveyor systems in the past have utilized rollers, skids, platforms on wheels, and the like, with the conveyor system resting on the floor or affixed to the loads or both. It is an object of the present invention to provide a new and improved conveyor system which can be disposed in or on the floor of the work area and which is readily controlled from a single or multiple locations and which does not require attachment to the loads. A further object is to provide such a conveyor system which can be utilized as part of the work area and one which does not in any way obstruct the work area.

The conveyor system of the invention utilizes a plurality of air cushion units in a bed. The air cushion units are also known as compliant air bearings. A load carrying plate member is positioned on the air cushion units and typically may rest on a slight recess in the floor when the air units are unenergized. When air under pressure is introduced into the air cushion units, the plate member is raised above the level of the floor, engaging and raising the loads. A drive system is provided for advancing and retracting the plate members, carrying the loads to a new position after which the air cushion units are deflated with the plate members lowering away from the loads and with the drive system returning the plate members to the initial position. Other objects, advantages, features and results will more fully appear in the course of the following description. The drawings merely show and the description merely describes a preferred embodiment of the present invention which is given by way of illustration or example.

In the drawings:

FIG. 1 is a perspective view illustrating a housing assembly area incorporating a presently preferred embodiment of the invention;

FIG. 2 is an enlarged partial sectional view taken along the line 2—2 of FIG. 1;

FIGS. 3 and 4 are enlarged partial sectional views taken along the lines 3—3 of FIG. 1, showing an air cushion unit in the energized and de-energized conditions, respectively;

FIG. 5 is a partial sectional view taken along the line 5—5 of FIG. 1;

FIG. 6 is a view similar to that of FIG. 2 showing an alternative embodiment of the invention; and FIG. 7 is a view similar to that of FIGS. 2 and 6 showing another alternative embodiment.

FIG. 1 illustrates an assembly area 10 for fabricating housing modules 11, with five elongate conveyor units 12-16 disposed across the floor 17 of the assembly area in a parallel arrangement. The conveyor units may be identical in construction and the description given herein is applicable to all five units.

In the preferred embodiment of the conveyor unit illustrated herein, a bed in the form of a metal channel 20 with a bottom 21 and outwardly turned flanges 22, 23 is set in a pit 24 in the floor 17. The bed extends a substantial distance across the work area and typically may be in the order of 50 to 100 feet in length.

Air cushion units 30 are mounted in the bed 20, spaced along the length thereof. Air cushion units, or compliant air bearings as they are sometimes known, are widely used today and typical conventional air cushion units are shown in U.S. Pat. Nos. 3,161,247; 3,243,004; and 3,321,038. A typical air cushion unit utilizes a rigid upper wall member and a flexible lower wall member which are joined together to define a generally toroidal or annular chamber. Means are provided for introducing air under pressure into the chamber and into the central space enclosed by the toroidal chamber. Air flows from the central space under the toroidal chamber between the air cushion unit and the ground so that the air cushion unit rests on a film of air which permits the substantially frictionless lateral movement.

In the preferred form of conveyor system of FIGS. 1-5, the air cushion unit is utilized in an inverted position, with a rigid lower wall member 31 and a flexible upper wall member 32 joined together by clamps 33 or other suitable means, defining a chamber 34. Air under pressure is introduced into the central space 36 via a passage 35 and flows into the chamber 34 through openings 37.

The air cushion units 30 preferably are mounted within the channel 20 spaced upward from the bottom 21 and typically may be mounted on a plate 40 supported on channels 41, 42 and a box beam 43. The box beam 43 serves as a support for the air cushion units and also serves as a conduit for the incoming air supply.

A load carrying plate member 50 is positioned over the bed 20, overlying the air cushion units 30, and preferably is a channel shaped unit with parallel sides 51 and lateral flanges 52. A drive mechanism provides for reciprocating the plate member 50 along the bed 20 and typically may comprise a double acting cylinder 55 with a piston therein (not shown), connected to a piston rod 56 in turn connected to the plate member 50 by an angle bracket 57. Air under pressure is provided for actuating each of the cylinders 55 and for energizing the air cushion units 30. The air cushion supply typically is in the order of 15 psi and the supply for the drive cylinders typically is in the order of 90 psi. The conveyor system is not limited to this particular drive mechanism and other pneumatic, hydraulic, mechanical and electrical drives may be used as desired.

A control panel 60 may be utilized to control the air supply, with air being fed to the cylinders 55 and to the conduits 43 via pipes indicated generally at 61 disposed in a covered trench 62 in the floor 17. A control is provided for actuating the cylinders 55 in the forward and in the reverse directions. Separate off-on controls may be provided for selectively deactivating the cylinders 55 as desired. Another control may be provided to supply air to all of the air cushion units, with separate off-on controls for each conveyor unit as desired. A plurality of control panels may be provided at different locations permitting operation of the system from a plurality of stations.

In the initial position, the piston rods 56 are retracted into the cylinders 55, with the plate members 50 in the position shown in phantom lines in FIG. 2. The manufacturing operations are carried out with the conveyor units in the initial position. Typically a floor 65 may be assembled at the drive cylinder end of the system, with the house floor 65 resting on the assembly area floor 17. In the initial position, the air cushion units are unenergized or deflated and the plate member 50 rests directly on the air cushion units. It is preferred to have the weight of the plate members 50 carried by some other means and in the embodiment illustrated, the lateral flanges 52 of the plate members 50 rest on the flanges 22, 23 of the bed channel 20, as illustrated in FIG. 4.

When the assembly operations are completed and the units are to be moved, air is introduced to the air cushion units, inflating them to the condition shown in FIG. 3, with the air flow path indicated by the arrows. Inflation of the air cushion units raises the plate member 50 into engagement with the load 65, raising the load up from the floor 17, as seen in FIG. 3. Typically this raise may be in the order of four inches. The air bearing produced by air flow between the air cushion unit and the plate member produces a very low friction for the plate member.

The cylinders 55 are now energized to advance the pistons from the position shown in phantom lines in FIG. 2 to the position shown in FIG. 1, thereby moving all of the housing modules a step along the assembly line. A typical step is in the order of 12 feet. After the desired movement of the plate members has been accomplished, the air cushion units are de-energized, the plate members 50 move downward from the position of FIG. 3 to the position of FIG. 4, with the loads again resting on the floor 17. The air cylinders are now energized to move the plate members in the opposite direction to the initial position. This is readily accomplished, since the only load is the plate members themselves. This stepwise movement of the loads may be repeated as desired to advance the loads along the assembly line. A shroud 68 may be provided at the end of each conveyor unit opposite the drive unit to cover the air cushion units which are exposed when the system is in the initial position. Conventional roller type conveyor tracks 69 may be positioned at the downstream end of the assembly line for moving the loads off of the reciprocating conveyor units. By way of example, a plurality of rollers 70 may be positioned between support brackets 71 in a channel 72 set in the floor 17. The upper surface of the rollers 70 will be above the floor 17 so that when the plate members are lowered by de-energizing the air cushion units, the load will be deposited onto the rollers 70. A stop plate 75 may be provided at the downstream end if desired.

The conveyor system of the invention is set into the floor of the assembly area and normally is positioned slightly below the level of the floor, thereby providing a completely unobstructed work area and permitting use of the plate members 50 as part of the work area. The loads are lifted from the floor by the expansion of the air cushion units and by the lift provided by the air bearing operation, enabling the loads to be raised and moved with a relatively low pressure system. The air cushion units are positioned below the floor in the pits but are positioned upward from the bottom of the pits protecting the units from dirt and debris and enabling substantially maintenance free operation.

An alternative construction providing additional elevation by means of a separate lifting cushion is shown in FIG. 6, where elements corresponding to those of FIGS. 1–5 are identified by the same reference numerals. A lifting cushion 80, typically in the shape of an annulus or doughnut rests on a pad 81 between the plate 40 of the bed and the wall member 31 of the air cushion unit 30. Air under pressure is supplied to the air cushion unit 30 by a conduit 43' and a line 82, and is supplied to the lifting cushion 80 by a conduit 43'' and a line 83.

The air cushion unit 30 is operated as described in conjunction with FIGS. 1–5. The lifting cushion 80 may be inflated to provide additional elevation of the plate member 50 and the load when desired. The lifting cushion 80 and the air cushion 30 may be fed from the same air conduit if desired.

Another alternative construction with the air cushion units 30 carried on the plate member 50 is shown in FIG. 7. The wall member 31 is fixed to the plate member 50 and the air film flows from the central space 36 outward between the wall member 32 and the plate 40. Air passages 35' are disposed along the conduit 43 and direct air upward into the central space 36, with air flowing into the chamber 34 through the openings 37 in the usual manner. The passages 35' desirably are spaced apart about one-half the diameter of an air cushion unit so the central space 36 is always over an air passage.

Although exemplary embodiments of the invention have been disclosed and discussed, it will be understood that other applications of the invention are possible and that the embodiment disclosed may be subjected to various changes, modifications and substitutions without necessarily departing from the spirit of the invention. By way of example, the drive system for reciprocating the plate members is not limited to the double acting air cylinders illustrated and the plate members can be moved by a variety of mechanisms, including manual operation.

We claim:
1. In a conveyor system, the combination of:
means defining a bed;
a plurality of air cushion units disposed in a line in said bed, each of said air cushion units comprising a relatively rigid plate with a relatively flexible diaphragm affixed thereto at the center and at the periphery defining an annular space between the plate and diaphragm and a central space within said annular space exteriorly of said diaphragm, with at least one opening in the diaphragm providing an air path between said central space and said annular space;
a load carrying plate member resting on said air cushion units;
drive means for moving said plate member along said bed in forward and reverse directions; and
means comprising a passageway through said rigid plate for supplying air under pressure to one of said central space and annular space to thereby inflate each of said diaphragms raising said plate member with the plate member load distributed along said air cushion units and to provide a flowing film of air over each of said diaphragms for low friction between said plate member and bed.

2. A system as defined in claim 1 in which said bed includes spaced support members on opposite sides of said air cushion units for supporting said plate member when said air cushion units are unenergized, with said air cushion units lifting said plate member upward from said support members when energized with air under pressure.

3. A system as defined in claim 1 in which said bed includes an upwardly opening channel and said plate member includes a downwardly opening channel aligned with said bed channel.

4. A system as defined in claim 3 including mounting means for supporting said air cushion units in said upwardly opening channel above the bottom thereof.

5. A system as defined in claim 4 in which said mounting means includes an air conduit of said means for supplying air and communicating with each of said air cushion units.

6. A system as defined in claim 3 in which said air cushion units are disposed in an elongate pattern and in which said drive means provide reciprocating movement of said plate member along a portion of said pattern, with said air cushion units energized for plate member movement in one direction and de-energized for plate member movement in the opposite direction.

7. A system as defined in claim 1 wherein said air cushion units are fixed in said bed with upwardly facing bearing surfaces.

8. A system as defined in claim 1 wherein said air cushion units are fixed to said plate member with downwardly facing bearing surfaces.

9. In a conveyor system, the combination of:
means defining a plurality of spaced beds;
a plurality of air cushion units disposed in a line in each of said beds, each of said air cushion units comprising a relatively rigid plate with a relatively flexible diaphragm affixed thereto at the center and at the periphery defining an annular space between the plate and the diaphragm and a central space within said annular space exteriorly of said diaphragm, with at least one opening in the diaphragm providing an air path between said central space and said annular space;
a plurality of plate members, with a plate member resting on the air cushion units at each of said beds;
drive means for moving said plate members along said beds in forward and reverse directions in synchronism; and
means comprising a passageway through said rigid plate for supplying air under pressure to one of said central space and annular space to thereby inflate the diaphragm raising the plate member with the plate member load distributed along the air cushion units and to provide a flowing film of air over the diaphragm for low friction between plate member and bed.

\* \* \* \* \*